(12) United States Patent
Dai

(10) Patent No.: US 8,410,933 B2
(45) Date of Patent: Apr. 2, 2013

(54) ELECTRONIC DEVICE AND THEFT WARNING METHOD THEREOF

(75) Inventor: Lung Dai, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 452 days.

(21) Appl. No.: 12/770,774

(22) Filed: Apr. 30, 2010

(65) Prior Publication Data

US 2011/0074593 A1    Mar. 31, 2011

(30) Foreign Application Priority Data

Sep. 28, 2009  (CN) .......................... 2009 1 0307859

(51) Int. Cl.
   *G08B 13/14* (2006.01)
(52) U.S. Cl. ................ 340/568.1; 340/568.3; 340/568.4
(58) Field of Classification Search ............... 340/539.1, 340/539.11, 539.14, 568.1, 568.2, 568.3, 340/568.4, 571, 572.1, 572.3, 572.4, 572.7, 340/870.01, 870.02, 870.03, 870.11, 870.12; 235/435, 487, 492; 370/311
See application file for complete search history.

(56) References Cited

FOREIGN PATENT DOCUMENTS

CN          1091218 A          8/1994

*Primary Examiner* — Van T. Trieu
(74) *Attorney, Agent, or Firm* — Altis Law Group, Inc.

(57) ABSTRACT

A theft warning system includes a first electronic device and a second electronic device. The first electronic device is configured for transmitting monitoring signals, wherein the frequency of the monitoring signals is capable of changing according to change in the voltage supplied to the first electronic device. The second electronic device communicates with the first electronic device by receiving the monitoring signals transmitted by the first electronic device, and generating alarms when a frequency of the received monitoring signals is changed. A theft warning method applied to the electronic device is also provided.

18 Claims, 3 Drawing Sheets

ELECTRONIC DEVICE AND THEFT WARNING METHOD THEREOF

BACKGROUND

1. Technical Field

The present disclosure generally relates to electronic devices, particularly to a portable electronic device and a theft warning method being applied to the portable electronic device.

2. Description of Related Art

Portable electronic devices, such as notebook computer, are widely used. However, the portable electronic devices may be easily lost or stolen because of their portability.

Therefore, there is room for improvement within the art.

BRIEF DESCRIPTION OF THE DRAWINGS

The components of the drawings are not necessarily drawn to scale, the emphasis instead being placed upon clearly illustrating the principles of the embodiments of the electronic device and the theft warning method thereof. Moreover, in the drawings, like reference numerals designate corresponding parts throughout several views.

DETAILED DESCRIPTION

Figure 1:
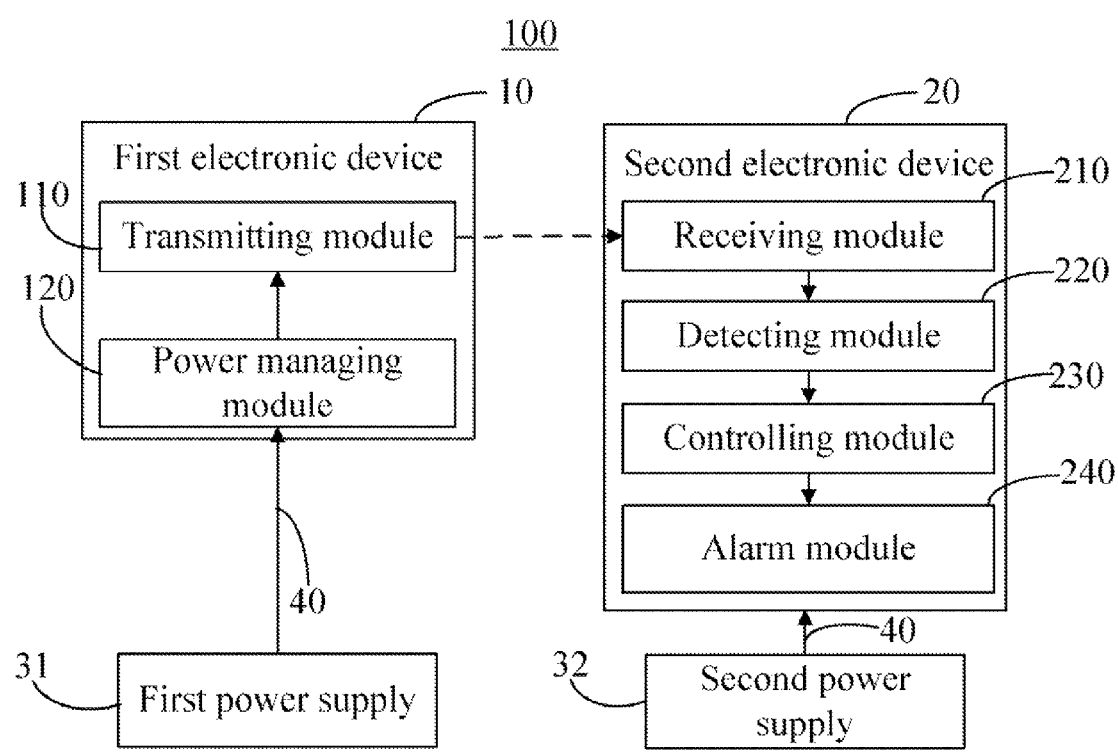
FIG. 1 shows a block diagram of a theft warning system, according to an exemplary embodiment.

Referring to FIG. 1, a theft warning system 100 includes a first electronic device 10 such as a mobile phone or a personal digital assistant (PDA), a second electronic device 20 such as a monitoring device, a first power supply 31, a second power supply 32, and a plurality of power wires 40. The first electronic device 10 may be separate from the second electronic device 20. A wireless communication connection can be established between the first electronic device 10 and the second electronic device 20. The wireless communication connection may be based on frequency modulation (FM), BLUETOOTH, or infrared wireless communication technologies. It is noteworthy that the first electronic device 10 also can be electrically connected to the second electronic device 20 in a wired manner. The first and second power supplies 31, 32 are electrically connected to the first and second electronic devices 10, 20 via the power wires 40 respectively. The power supplies 31, 32 are used for supplying electrical power to the first and second electronic devices 10, 20 respectively.

The first electronic device 10 includes a transmitting module 110 and a power managing module 120. The transmitting module 110 is electrically connected to the first power supply 31 via the power managing module 120. The power managing module 120 obtains the output voltage of the first power supply 31 and supplies the obtained output voltage to the transmitting module 110. The transmitting module 110 is used to communicate with the second electronic device 20 by transmitting monitoring signals having a predetermined frequency to the second electronic device 20. The frequency of the monitoring signals transmitted by the first electronic device 110 is capable of changing according to the different voltages supplied to the transmitting module 110. For example, when the power managing module 120 supplies a first voltage to the transmitting module 110, the transmitting module 110 transmits monitoring signals having a first frequency, and when the power managing module 120 supplies a second voltage different from the first voltage to the transmitting module 110, the transmitting module 110 transmits monitoring signals having a second frequency, the second frequency is different from the first frequency.

In the embodiment, to protect the first electronic device 10 from theft, the power managing module 120 supplies a constant voltage to the transmitting module 110. Thus, the transmitting module 110 continuously transmits monitoring signals having a predetermined frequency, and the frequency of the monitoring signals transmitted by the transmitting module 110 is unchanged until the voltages supplied by the power managing module 120 is changed. Therefore, when the first electronic device 10 is disconnected from the first power supply 31 as in a situation where someone is surreptitiously removing or stealing the first electronic device 1, the frequency of the monitoring signals transmitted by the transmitting module 110 is changed.

Furthermore, a switch (not shown) can be set between the power managing module 120 and the first power supply 31. Users can power on/off the first electronic device 110 by controlling the switch.

The second electronic device 20 includes a receiving module 210, a detecting module 220, a controlling module 230, and an alarm module 240.

The receiving module 210 is used to communicate with the transmitting module 110 by receiving the monitoring signals having a predetermined frequency from the transmitting module 110. The detecting module 220 is electrically connected to the receiving module 210, and is further electrically connected to the controlling module 230. The detecting module 220 is used to detect whether the frequency of the monitoring signals received by the receiving module 210 is changed, and is able to generate an alert signal if the frequency of the monitoring signals received by the receiving module 220 is changed. The controlling module 230 is configured to control the alarm module 240 making alarms (e.g. sounds, light indications) in response to the alert signals.

In operation, the power managing module 120 supplies a constant voltage to the transmitting module 110. Thus, the transmitting module 110 continuously transmits monitoring signals having a constant first frequency to the receiving module 210, and the first frequency of the monitoring signals received by the receiving module 210 is unchangeable until the power managing module 120 is cut off.

In some cases, connection between the first electronic device 10 and the first power supply 31 is cut off. Accordingly, the voltage supplied by the power managing module 120 is changed to 0, that is, the voltage supplied to the transmitting module 110 is changed. Thus, the receiving module 210 transmits monitoring signals having a second frequency different from the first frequency. As a result, the detecting module 220 generates the alert signal to the controlling module 230 because of the changed frequency of monitoring signals. The controlling module 230 controls the alarm module 240 sending alarms in response to the alert signals to remind a user of the second electronic device 20 that the first electronic device 10 is disconnected from the first power supply 31 and may be stolen. As a result, it may allow the user to stop the theft of the first electronic device 10.

Figure 2:
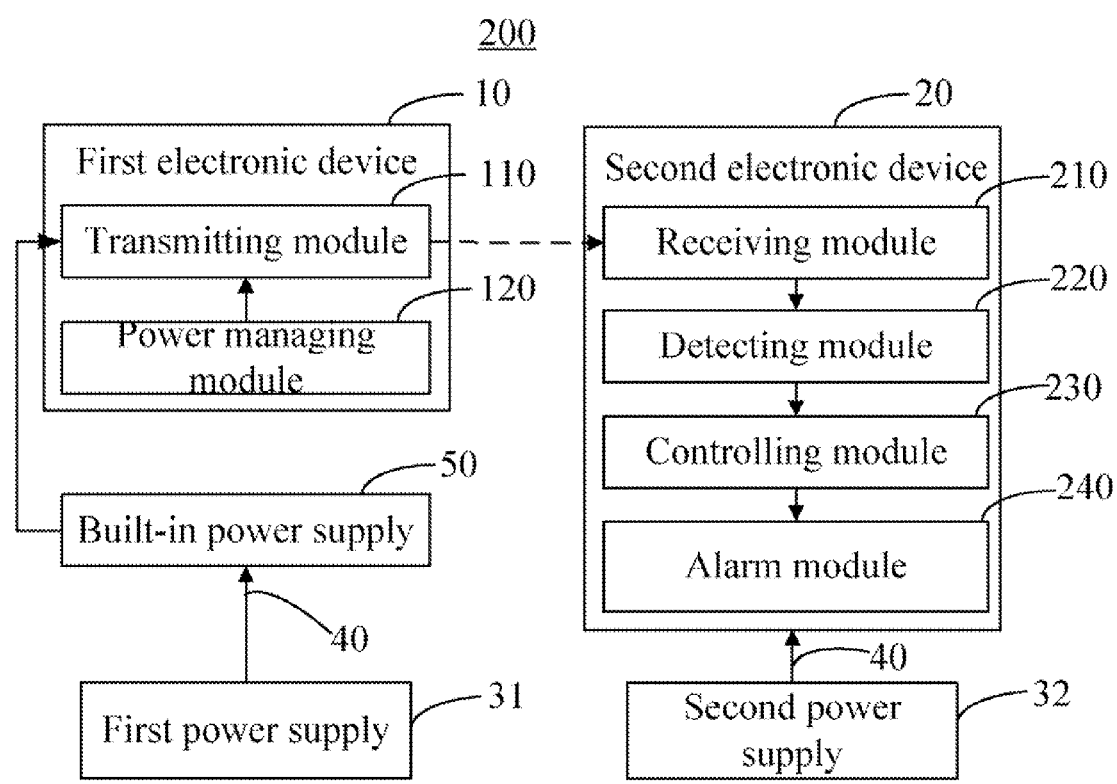
FIG. 2 shows a block diagram of a theft warning system, according to another embodiment.

Referring FIG. 2, a block diagram of a theft warning system 200 in another embodiment is shown. The theft warning system 200 is similar to the theft warning system 100. The difference between the theft warning systems 100 and 200 is that the first electronic device 10 of the theft warning system 200 further includes a built-in power supply 50.

The built-in power supply 50 is electrically connected to the transmitting module 110, and is received in the electronic device 200. When the power managing module 120 stops supplying power to the first electronic device 110, the built-in power supply 50 is configured to supply power to the transmitting module 110, such that the transmitting module 110 works continuously transmitting monitoring signals. In the embodiment, the voltage that the built-in power supply 50 supplies for the transmitting module 110 is different from the voltage supplied by the first power supply 31. When the built-in power supply 50 supplies power for the transmitting unit 110, the transmitting unit 110 transmits monitoring signals having a third frequency. When the first power supply 31 supplies power for the transmitting unit 110, the transmitting unit 110 transmits monitoring signals having a fourth frequency different from the third frequency. Therefore, when the power wires 40 electrically connected to the first power supply 31 are cut off, the built-in power supply 50 supplies a different voltage for the transmitting module 110, that is, the voltage supplied to the transmitting module 110 is changed. Thus, the frequency of the radio received by the receiving module 210 is changed from the fourth frequency to the third frequency. As a result, the detecting module 220 generates alert signals to controlling module 230, and the controlling module 230 controls the alarm module 240 sending alarms in response to the altered signal to warn owners.

Figure 3:
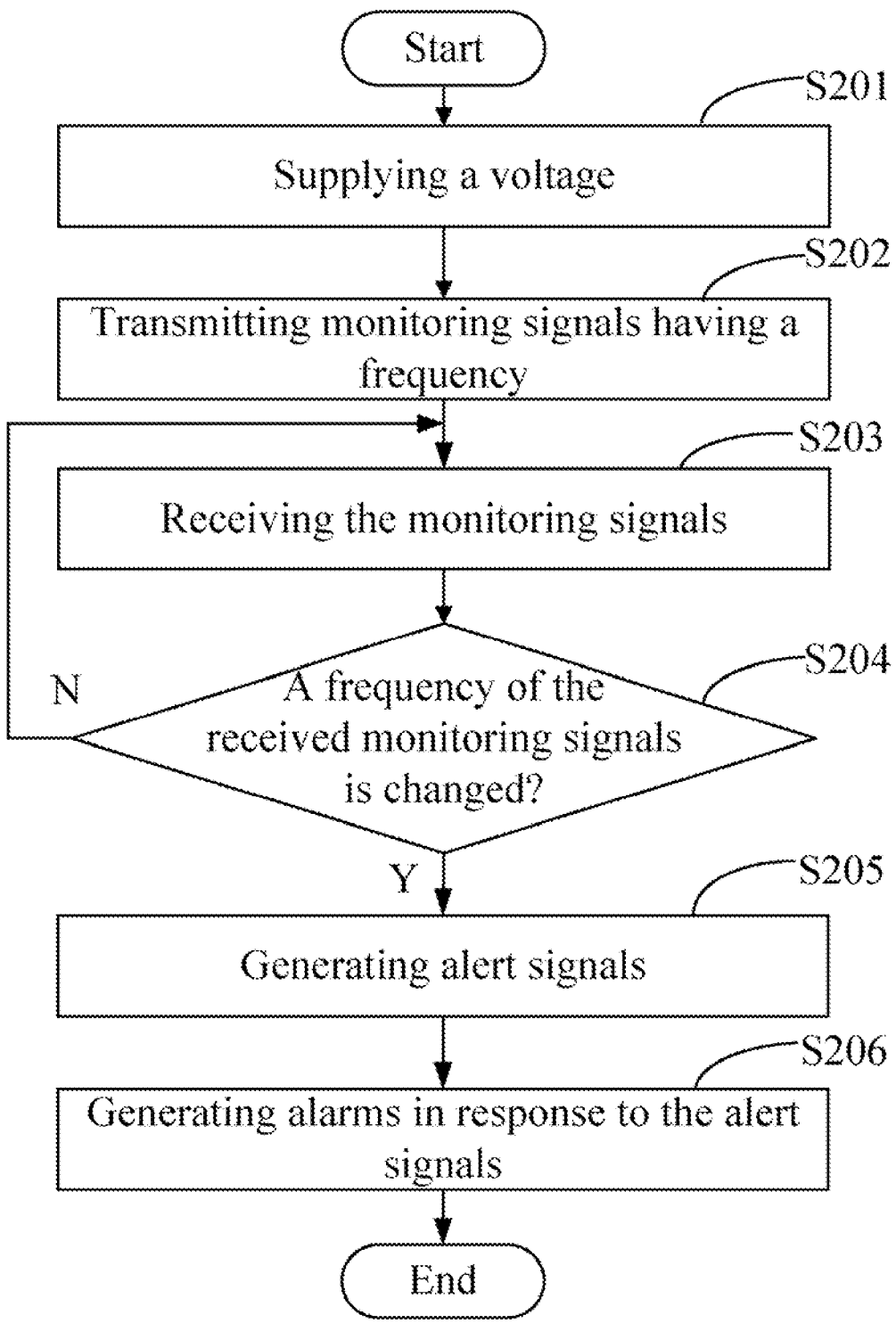
FIG. 3 shows a flow chart of a theft warning method in accordance with an embodiment.

Referring to FIG. 3, a flowchart of a theft warning method in accordance with yet an embodiment is shown. The various actions in the method may be performed in the order presented, or may be performed in a different order. Furthermore, in some embodiments, some actions shown in FIG. 3 may be omitted from the method. The method may include the following steps:

In step S201, the power managing module 120 obtains a voltage from the first power supply 31 to supply the transmitting module 110.

In step S202, the transmitting module 110 transmits monitoring signals having a frequency according to the voltage supplied by power managing module 120.

In step S203, the receiving module 210 receives the monitoring signals transmitted by the transmitting module 110.

In step S204, the detecting module 220 judges whether a frequency of the received monitoring signals is changed, if yes, the process goes to S205, if no, the process returns to S203.

In step S205, the detecting module 220 generates alert signals to the controlling module 230.

In step S206, the controlling module 230 controls the alarm module 240 to generate alarms in response to the alert signals to warn users.

Therefore, when the power wires 40 electrically connecting the power managing module 120 to the first power supply 31 are cut off, the receiving module 210 receives a changed monitoring signal transmitted by the transmitting module 110. The detecting module 220 generates alert signals. The controlling module 230 controls the alarm module 240 to generate alarms in response to the alert signals to the user. As a result, a warning is sent which may allow the user to stop the theft of the first electronic device 10.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An electronic device, comprising:
    a transmitting module adapted to transmit a monitoring signal to a monitor device; and
    a power managing module adapted to supply a voltage to the transmitting module;
    wherein the transmitting module is configured to generate monitoring signals having different frequencies while being supplied with different voltages by the power managing module, and is further configured to transmit the monitoring signals having different frequencies to a monitoring device to detect the electronic device is disconnected from the power supply, thus the monitor device is capable of determining whether the electronic device is disconnected from a power supply according to the change in the monitoring signals.

2. The electronic device of claim 1, wherein the transmitting module transmits monitoring signals having a first frequency while being powered, and transmits another monitoring signals having a second frequency when the electronic device is disconnected from the power supply.

3. The electronic device of claim 2, wherein the first frequency is different from the second frequency.

4. The electronic device of claim 1, further comprising a built-in power supply, the built-in power supply electrically connected to the transmitting module, the built-in power supply configured to supply power to the transmitting module when the electronic device is disconnected from the power supply.

5. The electronic device of claim 4, wherein the voltage that the power supply supplies to the transmitting module is different from that of the built-in power supply supplies to the transmitting module.

6. The electronic device of claim 5, wherein the transmitting module transmits monitoring signals having a third frequency while being powered by the built-in power supply, and the transmitting module transmits another monitoring signals having a fourth frequency while being powered by the power supply.

7. The electronic device of claim 6, wherein the third frequency is different from the fourth frequency.

8. A theft warning method for preventing a thief from stealing a first electronic device, comprising:
    the first electronic device generating monitoring signals having different frequencies while being supplied with different voltages by power supply; and
    the first electronic device transmitting the monitoring signals having different frequencies to a monitoring device to detect the electronic device is disconnected from the power supply, thus the monitoring device is capable of determining whether the electronic device is disconnected from a power supply according to the change in the monitoring signal.

9. The theft warning method of claim 8, further comprising step of:
    generating alert signals if the frequency of the received monitoring signals is changed; and
    generating alarms in response to the alert signals.

10. A theft warning system, comprising:
    a first electronic device for generating monitoring signals having different frequencies while being supplied with different voltages by the power managing module and further transmitting the monitoring signals having different frequencies; and
    a second electronic device, wherein the second electronic device communicates with the first electronic device by receiving the monitoring signals having different frequencies transmitted by the first electronic device, and generating alarms when a frequency of the received monitoring signals is changed.

11. The theft warning system of claim 10, wherein the first electronic device comprises a transmitting module, the transmitting module is configured to transmit monitoring signals having a frequency according to a voltage supplied thereto.

12. The theft warning system of claim 11, further comprising a power supply, the power supply is electrically connected to the transmitting module, and is configured to supply power to the transmitting module.

13. The theft warning system of claim 12, wherein the transmitting module transmits monitoring signals having a first frequency to the second electronic device while being powered by the power supply, and transmits another monitoring signals having a second frequency while the power supply is cut off.

14. The theft warning system of claim 13, wherein the second electronic device comprises a receiving module, a detecting module, a controlling module, and an alarming module, the receiving module is configured to receive monitoring signals transmitted by the transmitting module, the detecting module electrically connected to the transmitting module is configured to generate alert signals to the controlling module if detecting that the frequency of the monitoring signals received by the receiving module is changed from the first frequency to the second frequency, the controlling module is configured to control the alarm module generating alarms according to the alert signals.

15. The theft warning system of claim 13, wherein the first frequency is different from the second frequency.

16. The theft warning system of claim 12, further comprising a built-in power supply, the built-in power supply electrically connected to the transmitting module, the built-in power supply configured to supply power to the transmitting module when the power supply is cut off.

17. The theft warning system of claim 16, wherein the voltage that the power supply supplies to the transmitting module is different from that of the built-in power supply supplies to the transmitting module.

18. The theft warning system of claim 17, wherein the transmitting module transmits a monitoring signal having a first frequency while being powered by the built-in power supply, and the transmitting module transmits another monitoring signal having a second frequency while being powered by the power supply, the first frequency is different from the second frequency.

* * * * *